(12) United States Patent  
Wahlström et al.

(10) Patent No.: US 9,707,511 B2  
(45) Date of Patent: Jul. 18, 2017

(54) TWO-STAGE GAS WASHING METHOD

(75) Inventors: Jan Wahlström, Porvoo (FI); Juhani Aittamaa, Helsinki (FI); Isto Eilos, Porvoo (FI)

(73) Assignee: NESTE OYJ, Espoo (FI)

( * ) Notice: Subject to any disclaimer, the term of this patent is extended or adjusted under 35 U.S.C. 154(b) by 263 days.

(21) Appl. No.: 13/368,975

(22) Filed: Feb. 8, 2012

(65) Prior Publication Data

US 2012/0214881 A1 Aug. 23, 2012

Related U.S. Application Data

(60) Provisional application No. 61/529,613, filed on Aug. 31, 2011.

(30) Foreign Application Priority Data

Feb. 8, 2011 (EP) .................................. 11153704.9

(51) Int. Cl.
*C22B 3/00* (2006.01)
*B01D 53/52* (2006.01)
(Continued)

(52) U.S. Cl.
CPC ....... *B01D 53/526* (2013.01); *B01D 53/1406* (2013.01); *B01D 53/1462* (2013.01); *C01B 17/20* (2013.01); *C01G 3/06* (2013.01); *C10J 3/00* (2013.01); *C10K 1/004* (2013.01); *C10K 1/005* (2013.01); *C10K 1/085* (2013.01); *C10K 1/108* (2013.01); *C10K 1/165* (2013.01);
(Continued)

(58) Field of Classification Search
None
See application file for complete search history.

(56) References Cited

U.S. PATENT DOCUMENTS

| 2,889,197 A | 6/1959 | Baumann |
| 3,435,590 A | 4/1969 | Smith |

(Continued)

FOREIGN PATENT DOCUMENTS

| CN | 101213010 A | 7/2008 |
| DE | 350591 C | 3/1922 |

(Continued)

OTHER PUBLICATIONS

Maat et al., "The removal of hydrogen sulfide from gas streams using an aqueous metal sulfate absorbent Part I. The absorption of hydrogen sulfide in metal sulfate solutions", Separation and Purification Technology 43 (2005) 183-197.*

(Continued)

*Primary Examiner* — Jennifer A Smith
*Assistant Examiner* — Anita Nassiri Motlagh
(74) *Attorney, Agent, or Firm* — Buchanan Ingersoll & Rooney PC

(57) ABSTRACT

The present description is related to the field of hydrocarbon production by gasification of carbonaceous material. It provides a two-stage gas washing method as a part of gas refining. More specifically it discloses a method for hydrogen sulfide and carbon dioxide removal from synthesis gas produced by gasification. It introduces a use of a novel combination of wash approaches for this application. As a specific application, this process is utilized as a part of biomass to liquid (BTL) process.

24 Claims, 4 Drawing Sheets

(51) Int. Cl.
  *B01D 53/14*  (2006.01)
  *C01B 17/20*  (2006.01)
  *C01G 3/06*  (2006.01)
  *C10K 1/10*  (2006.01)
  *C10J 3/00*  (2006.01)
  *C10K 1/00*  (2006.01)
  *C10K 1/08*  (2006.01)
  *C10K 1/16*  (2006.01)

(52) U.S. Cl.
  CPC ............ *B01D 2252/2021* (2013.01); *B01D 2257/304* (2013.01); *B01D 2257/504* (2013.01); *C10G 2300/1011* (2013.01); *C10G 2300/207* (2013.01); *C10G 2300/44* (2013.01); *C10J 2300/0916* (2013.01); *Y02C 10/06* (2013.01); *Y02E 20/18* (2013.01); *Y02E 50/32* (2013.01); *Y02P 20/145* (2015.11); *Y02P 20/152* (2015.11); *Y02P 30/20* (2015.11)

(56) References Cited

U.S. PATENT DOCUMENTS

| | | | |
|---|---|---|---|
| 3,761,569 | A | 9/1973 | Heiba et al. |
| 4,252,548 | A | 2/1981 | Markbreiter et al. |
| 4,298,584 | A | 11/1981 | Makrides |
| 4,749,555 | A * | 6/1988 | Bush ............ B01D 53/1493 423/226 |
| 5,670,123 | A | 9/1997 | Mileo |
| 6,550,751 | B1 | 4/2003 | Brown et al. |
| 8,354,457 | B2 | 1/2013 | Ernst |
| 2004/0036055 | A1 | 2/2004 | Asprion et al. |
| 2005/0109210 | A1 | 5/2005 | Davis et al. |
| 2009/0220406 | A1* | 9/2009 | Rahman ............... 423/437.1 |
| 2009/0293722 | A1 | 12/2009 | Svendsen et al. |
| 2010/0163803 | A1 | 7/2010 | Klein |
| 2010/0280137 | A1 | 11/2010 | Kukkonen et al. |
| 2010/0288458 | A1 | 11/2010 | Karlsson et al. |
| 2010/0305220 | A1 | 12/2010 | Kukkonen et al. |
| 2010/0310439 | A1 | 12/2010 | Brok et al. |
| 2010/0317749 | A1 | 12/2010 | Kukkonen et al. |
| 2010/0317903 | A1 | 12/2010 | Knuuttila |
| 2010/0317905 | A1 | 12/2010 | Kukkonen et al. |
| 2011/0009501 | A1 | 1/2011 | Ernst |
| 2012/0131853 | A1 | 5/2012 | Thacker et al. |
| 2012/0202897 | A1 | 8/2012 | Keskinen et al. |
| 2013/0053456 | A1 | 2/2013 | Wahlstrom et al. |

FOREIGN PATENT DOCUMENTS

| | | |
|---|---|---|
| DE | 23 04 497 A1 | 8/1974 |
| EP | 0 986 432 B1 | 1/2005 |
| EP | 2 223 889 A2 | 9/2010 |
| EP | 2 484 427 A2 | 8/2012 |
| GB | 497 255 A | 12/1938 |
| GB | 1 483 038 A | 8/1977 |
| WO | WO 98/55209 A1 | 12/1998 |
| WO | 02/04098 A1 | 1/2002 |
| WO | WO 2004/072207 A1 | 8/2004 |
| WO | 2007/009943 A1 | 1/2007 |
| WO | 2008/113766 A2 | 9/2008 |
| WO | 2009/113006 A2 | 9/2009 |
| WO | 2010/060978 A1 | 6/2010 |
| WO | WO 2011/107661 A1 | 9/2011 |

OTHER PUBLICATIONS

Maat et al., "Theoretical and Experimental Study of the Absorption Rate of H2S in CuSO4 Solutions: The Effect of Enhancement of Mass Transfer by a Precipitation Reaction", Trans IChemE, Part A, Chemical Engineering Research and Design, 2007, 85(A1): 100-108.*
Ferrell et al., "The Solubility of Acid Gases in Methanol", Interagency Energy/Environment R&D Program Report, EPA-600/7-79-097, Apr. 1979.*
Esteban et al., "Exploit the Benefits of Methanol" Proceedings of 79th GPA Annual Convention, Atlanta, GA, Gas Processors Association, (2000), 21 pages.
The extended European Search Report dated Jul. 27, 2012, issued in corresponding European Patent Application No. 11179451.7. (6 pages).
Notification of Transmittal of the International Search Report (Forms PCT/ISA/220 and PCT/ISA/210) and the Written Opinion of the International Searching Authority (Form PCT/ISA/237) dated Aug. 14, 2012, issued in corresponding International Application No. PCT/FI2012/050112. (13 pages).
EPA, EPA Air Pollution Control Cost Manual, Sixth Edition, Jan. 2002.
Karl I. Keskinen et al., U.S. Appl. No. 13/369,197, filed Feb. 8, 2012.
H. ter Maat et al., "The Removal of Hydrogen Sulfide from Gas Stream Using an Aqueous Metal Sulfate Absorbent Part I. The Absorption of Hydrogen Sulfide in Metal Sulfate Solutions", Separation and Purification Technology 43 (2005) 183-197.
H. ter Maat et al., "Theoretical and Experimental Study of the Absorption Rate of H2S in CuSO4 Solutions, The Effect of Enhancement of Mass Transfer by a Precipitation Reaction", Trans IChemE, Part A, Chemical Engineering Research and Design, 2007, 85(A): 100-108.
European Search Report for EP 11153704 dated Jul. 4, 2011.
Search Report issued on Jul. 20, 2011, by European Patent Office for Application No. 11153704.9.
Translation of Chinese Office Action (Search Report) issued in Chinese Patent Application No. 201280041886.3 issued Jun. 26, 2015.
Jan Wahlstrom et al., U.S. Appl. No. 13/601,670, filed Aug. 31, 2012.
Search Report issued on Dec. 21, 2011 by European Patent Office for Application No. 11179453.3.
Notification of Transmittal of the International Search Report and the Written Opinion of the International Searching Authority and International Search Report (Forms PCT/ISA/220 and PCT/ISA/210) issued Apr. 29, 2013 in International Application No. PCT/FI2012/050816 (6 pages).
Written Opinion of the International Searching Authority (Form PCT/ISA/237) issued on Apr. 29, 2013 in International Application No. PCT/FI2012/050816 (8 pages).

* cited by examiner

TWO-STAGE GAS WASHING METHOD

TECHNICAL FIELD

The present description is related to the field of hydrocarbon production by gasification of carbonaceous material. It provides a two-stage gas washing method as a part of syngas refining process. More specifically it discloses a method for hydrogen sulfide and carbon dioxide removal from synthesis gas produced by gasification. It introduces a use of a novel combination of wash approaches for this application, one of which involves a chemical reaction and the other is based on physical absorption. As a specific application, this process is utilized as a part of biomass to liquid (BTL) process.

BACKGROUND

The gasification of carbonaceous material produces primarily carbon monoxide and hydrogen, mixture known as syngas. Carbon dioxide, water and various hydrocarbons are abundant side products in the gasification product. Depending on the source and composition of the carbonaceous raw material and gasification conditions, the levels of side products and derivatives typically present as impurities vary influencing the refining strategies.

During gasification, the sulfur and its derivatives originated from biomass are mainly converted to hydrogen sulfide ($H_2S$) and carbonyl sulfide (COS). In comparison to coal gasification, gasifying biomass raw material produces very low levels of sulfidic, relatively low levels of nitric and low levels of ashes impurities. The level of carbon dioxide is typically higher than in coal gasification. These impurity levels are still harmful for further chemical processing and the gas must be purified. The decrease of hydrogen sulfide concentration is compulsory for the functioning of the catalysts later in the refining of the syngas. On the other hand, the carbon dioxide's role in the further reactions is basically as an inert. The reason for removing $CO_2$ relates to optimizing the streams and decreasing volumes of recycle flows and equipment. The strategies known from coal gasification are not readily applicable.

Together carbon dioxide, hydrogen sulfide and carbonyl sulfide are referred to as acid gas since they dissolve in water forming acids. One of the most common means for gas purification is absorption, which has been used for acid gas removal from natural and synthesis gases. When purifying biomass originated synthesis gas, absorption with a liquid solvent has shown to be more efficient than solid absorption. For physical absorption, organic solvents at cold temperatures and high pressure are common. Roughly, the higher the pressure, the colder the temperature and higher the purity of the absorbent, the better is the washing effect. For chemical absorption, solutions of arsenic salts, various amines and carbonates are known. Generally, the absorbent is regenerated by rising the temperature and/or releasing the pressure.

Prior art discloses effective absorbents for removing acid gas using e.g. methanol. Methanol requires low temperatures to be efficient and to avoid absorbent loss. A very well-known commercial process using methanol is desulfurization process marketed under trade name Rectisol®. The Rectisol desulfurization process does not require hydrolysis of COS to $H_2S$ and can reduce sulfur compound contents to relatively low levels in syngas. Methanol has a high affinity for hydrocarbons as well as for acid gas. It also exhibits capabilities to remove not only sulfur compounds and $CO_2$ but also many relevant trace components (carbonyles, HCN), which makes Rectisol wash a useful process. The syngas is then reheated to about 350° C. and passed through a fixed bed of a sorbent for sulfur compounds, such as a ZnO guard bed, to further reduce the sulfur compound contents in the syngas. Large temperature differences between process phases consume a lot of energy and makes processing expensive.

In prior art, document EP 2223889 discloses a device providing further development of the multistage methanol wash as a part of Integrated Gasification Combined Cycle, IGCC. With the device disclosed, as a multistage process, this version of Rectisol process removes $CO_2$ as well from the gas. As a process related to power production, the purity requirements are, however, different from those applied in chemical or fuel production wherein higher purity is demanded.

Another document of prior art, US 2010163803, discloses a process for the production of gas products from a raw synthesis gas that is obtained by gasification of carbon and/or heavy oil. Origin of the gas gives it a characteristic component profile. The process description discloses how both the shifted and the unshifted gas streams are purified of sulfur components and $CO_2$ in sour gas washing, more specifically a cryogenic methanol washing. An apparatus suitable for the process is disclosed as well. Both sulfur components and $CO_2$ are removed together, the washes providing no separation of these components.

In addition to physical absorption described above, chemical absorption is known in the art. Gas containing large volumes of hydrogen sulfide can be freed from said hydrogen sulfide by first conducting the gas stream into aqueous solutions containing copper ions in water for absorbing the hydrogen sulfide and then oxidizing the copper sulfide thus formed with air or oxygen gas to produce elemental sulfur. Prior art document DE 2304497 discloses an aqueous absorption medium which contains rather high concentrations of copper ions (28.9 g Cu in 1400 ml water), and absorption of the hydrogen sulfide carried out by bubbling the gas into the aqueous medium.

Another document representing prior art, EP0986432 B1, discloses a method for selective hydrogen sulfide removal from gases comprising both $H_2S$ and $CO_2$. When these components were present in the gas in $CO_2$ to $H_2S$ ratio of 2:1, the method removed 99% of the $H_2S$ selectively. However, when said ratio was 200:1, the $H_2S$ removal was 95%.

There still is a need for an alternative method for removal of sulfur components and carbon dioxide from syngas obtainable by gasification of carbonaceous material, especially when gasifying biomass. Further, there is a need to remove sulfur components and carbon dioxide from the syngas in an energy efficient way. There also is a need for an effective combined sulfur component and carbon dioxide removal. Yet, there is constant need for simplification, increase of the effectiveness and identification of possibilities for synergism of the overall BTL process.

SUMMARY OF THE INVENTION

The present inventors have surprisingly found that a washing method comprising two different absorption steps, one of which involves chemical absorption and the other a physical one, provides high purity product with lower energy consumption than prior art methods. As the first aspect, a method for washing hydrogen sulfide and carbon dioxide from a gas obtainable by gasification of carbonaceous biomass is provided here comprising a. contacting said gas with a first absorbent solution comprising transition metal ions, said transition metals selected from copper, zinc, iron and cobalt and mixtures thereof, in acidic aqueous solution;
b. binding sulfide ions to said first absorbent solution;
c. recovering the gas from step b;
d. contacting recovered gas from step c with a second absorbent solution comprising an organic solvent:
e. binding carbon dioxide to said second absorbent solution:
f. recovering the washed gas from step e.

This method and embodiments thereof provide advantages. One advantage is a process design, wherein the need for thermal conditioning and heat exchanger equipment, especially for cooling, is significantly reduced compared to processes using methanol wash only. The two-step washing arrangement is necessary because of high levels of both $H_2S$ and $CO_2$, but surprisingly the $H_2S$ removal in the first absorption step effects the second absorption by releasing the requirements for absorption conditions e.g. allowing higher temperature for organic solvent wash. Moreover, the energy consumption is smaller.

As the present method is especially suitable for washing biomass derived syngas, the wash combination, especially at given sequence provides efficient treatment for gas having high $CO_2$ and $H_2S$ mole concentrations. This method has proven to produce washed gas having a $H_2S$ level of less than 20 ppb, and even lower levels, less than 1 ppb.

As the second aspect, when used as a part of a biomass to liquid process, the washing method is applied among the other process steps providing an improved method for producing hydrocarbons or derivatives thereof. The method then comprises the steps:
 i. gasifying the biomass raw material in the presence of oxygen and/or steam to produce a gas comprising carbon monoxide, carbon dioxide, hydrogen, water and hydrocarbons;
 ii. optionally a tar reforming step;
 iii. optionally removing tar components e.g. naphthalene;
 iv. optionally adjusting the hydrogen to carbon monoxide ratio;
 v. wash according to claim 1;
 vi. converting in a synthesis reactor at least a significant part of the carbon monoxide and hydrogen contained in the gas into a product selected from hydrocarbon composition and derivatives thereof; and
 vii. recovering the product When the synthesis of step vi is Fischer-Tropsch (FT) synthesis, the wash protocol of step v reduces the levels of acid gases in the feed of FT synthesis process to levels as low as 20 ppb meeting requirements for FT catalysts, and the level of $CO_2$ is low enough to prevent accumulation thereof in the process.

DETAILED DESCRIPTION OF THE INVENTION

Figure 1:
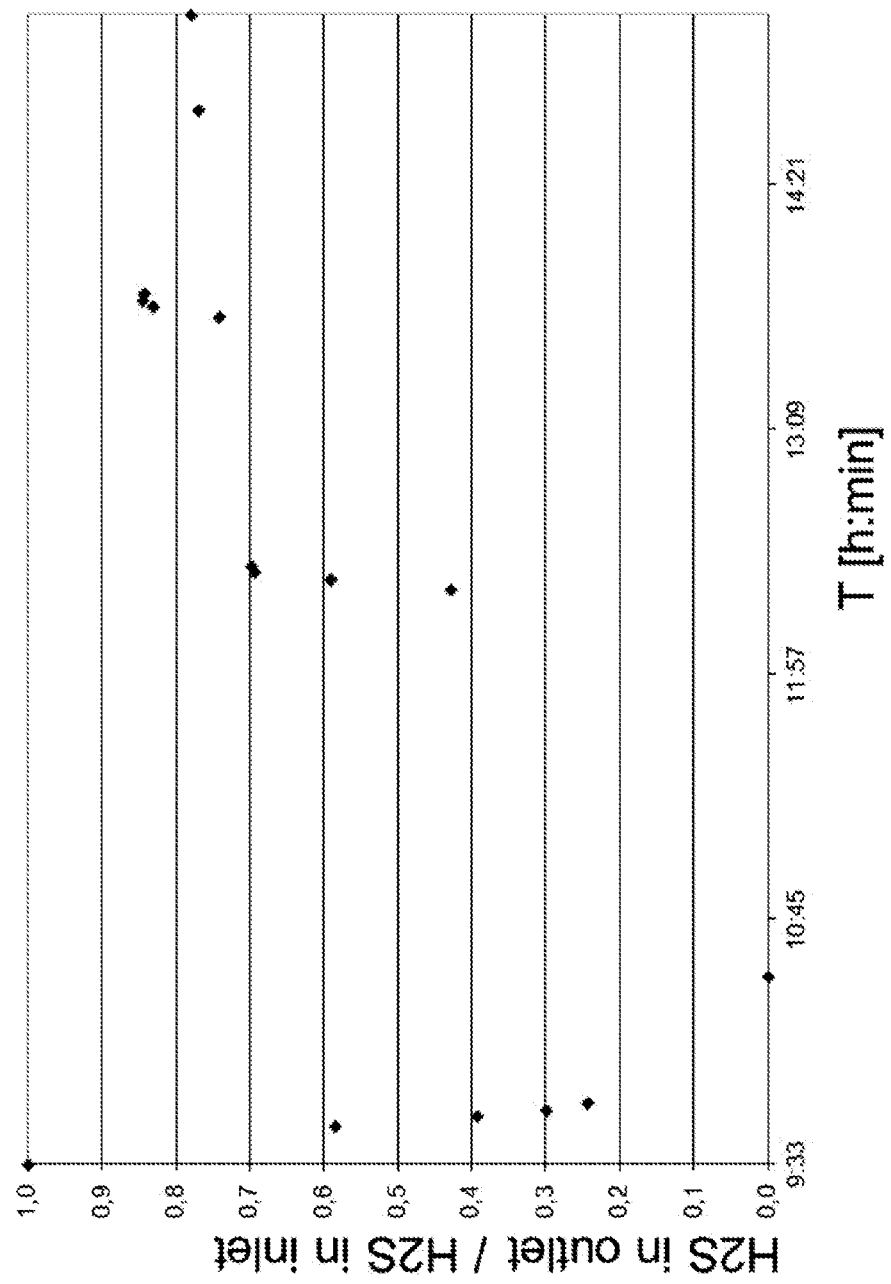
FIG. 1 illustrates an experiment comprising contacting with first absorbent solution, here aqueous $CuSO_4$ solution, binding $H_2S$ thereto and recovering gas according to steps a, b and c of claim 1. In the figure, a ratio of $H_2S$ mole flow in the wash bottle outlet/$H_2S$ mole flow in the wash bottle inlet as a function of time [h:min] is disclosed. The experiment was started at 9:33 and last point measured 15:11.

Herein is provided a novel method for washing of hydrogen sulfide ($H_2S$) and carbon dioxide ($CO_2$) from a gas obtainable by gasification of carbonaceous biomass. Characteristic for this method is that it involves two consequent washes, one of which involves a chemical reaction and the other is based on physical absorption. The first wash comprises
 a. contacting said gas with a first absorbent solution comprising transition metal ions, said transition metals selected from copper, zinc, iron and cobalt and mixtures thereof, in acidic aqueous solution;
 b. binding sulfide ions to said first absorbent solution;
 c. recovering the gas from step b;

The first wash removes selectively hydrogen sulfide from the gas. The removal efficiency is high. At least 90%, preferably at least 95% of the hydrogen sulfide present in the feed can be removed in this step.

The second wash comprises
 d. contacting the gas recovered from step c with a second absorbent solution comprising an organic solvent:
 e. binding carbon dioxide to said second absorbent solution:
 f. recovering the washed gas from step e.

The second wash principally removes carbon dioxide. As the concentration of hydrogen sulfide has already been considerably diminished in the first wash step, the absorbing capacity of the second absorbent can be used mainly for the carbon dioxide removal. The inventors have found that the hydrogen sulfide concentration is further lowered in the second wash providing recovered gas of such a high purity, that in some cases guard beds removing $H_2S$ prior to synthesis reactions can be omitted.

When applying the method of the present invention, the selection of the conditions for the second wash can be less stringent than when applying corresponding wash with organic solvent detached. The temperature, pressure, recycling etc. need not to be pushed to extremes to obtain desired purity levels. Especially notable is the temperature with which high purity was acquired also experimentally.

Yet another benefit of the present invention is that when applying sequential removal of $H_2S$ first and $CO_2$ after that, these unit processes are essentially independent from each other. Especially, the second wash step can be steered to purity level required by the following processing without compromising the ultraclean character of the first absorption step. Thus independent control of the removal of acid gases is possible through the present method.

As used herein, "absorbent solution" refers to a wash liquid used for washing the gas. For processing purposes, as fresh, it is preferably a true solution, thus all components are solubilized in the solvent. A person skilled in the art understands, that when used, especially when there has been a chemical reaction involved, said absorbent solution may contain solids or precipitates.

With "binding a gas to an absorbent solution" is meant basically absorption of said gas to said solution. It includes all phases of absorption, mass transfer from gas to gas-solvent interface, dissolution from gas to liquid phase, and in a case of chemical absorbent, the chemical reaction in question.

The two-stage method removes preferably at least 99%, preferably at least 99.9% of the $H_2S$ present in the feed gas. Of the carbon dioxide, the removal is at least 90%, preferably at least 95% of the $CO_2$ present in the feed gas.

When describing the process, measurements and results, the proportions given are percentages of the total gas volume of the dry gas unless otherwise stated.

Figure 4:
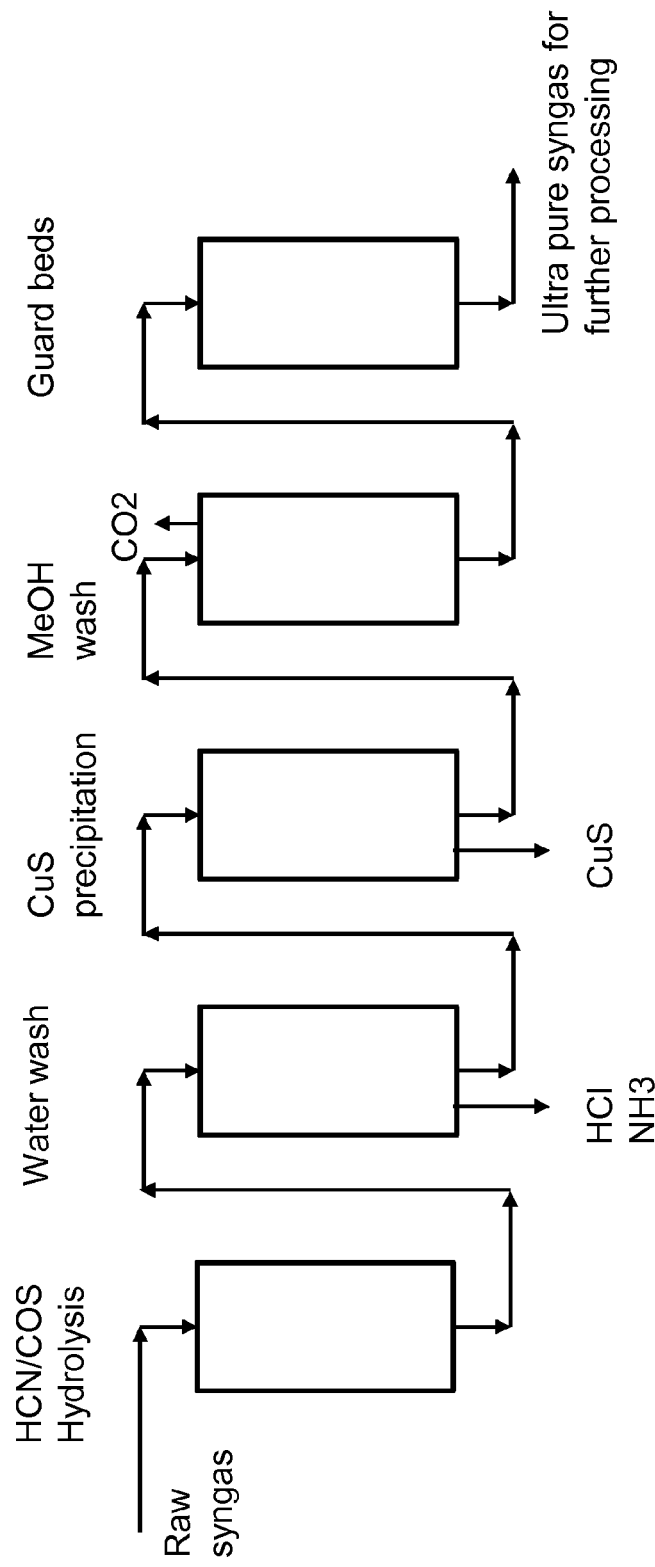
FIG. 4 discloses a simple flow diagram of an embodiment of the method of the present invention for $H_2S$ and $CO_2$ removal by a two-stage process.

An illustration of the method is given in FIG. 4, which discloses a simple flow sheet of an embodiment of the method of the present invention for $H_2S$ and $CO_2$ removal by a two-stage process. In said FIG. 4, the raw syngas is fed to an optional hydrolysis reactor, which converts HCN and COS, followed by an optional water wash reactor, from the outlet of which aqueous HCl and $NH_3$ are removed. The essence of the invention lies within the next two reactors. The first of these is a reactor named in the FIG. 4 as CuS precipitation unit. In said reactor, the gas is contacted with dilute aqueous $CuSO_4$ solution. With sulfides originating from gaseous hydrogen sulfide, copper forms CuS, which is practically insoluble in water and precipitates out of the solution.

Gas thus recovered is next led to methanol wash unit to remove $CO_2$. Methanol has good capacity to remove acid gases, but as major part of gaseous hydrogen sulfide has already been removed in the preceding step, the unit is designed for $CO_2$ removal only.

According to the embodiment described in FIG. 4, the gas is fed to the absorber (CuS precipitation) from a gas scrubber (water wash). The first absorption step in acidic aqueous solution can preferably be performed at the same temperature as said scrubbing, cooling is only required before the second wash with methanol.

Optionally a guard bed (FIG. 4) or multiple guard beds can be added downstream of the units, for safety and in case of abnormal situations.

The combination of first and second absorbents according to claim 1 has surprisingly proven to allow desired purity and separate recovery of $CO_2$ and $H_2S$ providing savings in energy consumption in comparison to one step methanol wash when removing both $H_2S$ and $CO_2$.

Feed Characteristics

When refining syngas obtainable from gasification of biomass the acid gases consist mainly of $H_2S$, $CO_2$ and COS. As an example of a typical composition, the gas composition fed to acid gas wash comprises as main components (calculated of the dry gas) from 20 to 40 vol-% $H_2$, from 10 to 30 vol-% of CO, and as acid gas impurities from 50 to 400 ppm $H_2S$, from 20 to 40 vol-% $CO_2$ and 5 to 50 ppm COS and other traces.

Special characteristics for refining gas originated from biomass are the high $CO_2$ and $H_2S$ concentrations. If there is a need to recover these components separately, the prior art references suggest using physical absorption, as chemical absorbents tend to remove $CO_2$ and $H_2S$ simultaneously.

Transition Metal Ions

In the method for washing hydrogen sulfide and carbon dioxide from a gas obtainable by gasification of carbonaceous biomass, the first step of this method comprises first contacting said gas with a first absorbent solution comprising transition metal ions in acidic aqueous solution.

This step is efficient for $H_2S$ removal. The present inventors found that in acidic aqueous solutions transition metal ions, for example $Cu^{2+}$ ions, react fast with $H_2S$ in liquid at even very small metal ion concentrations. The results were evidenced in patent application EP11153704 (not yet published) disclosing a method of purifying gasification gas (syngas) by absorbing impurities of syngas in a liquid absorption medium containing metal ions capable of binding sulfide ions into solid sulfides which have low solubility in water and aqueous solutions. Thus, said metal ions, preferably predominantly bivalent transition metal ions, have effect of binding sulfides, present as $H_2S$ in the gas phase, from gas to said first absorbent solution. When reacted with this solution, the gas is recovered for further processing.

Another prior art document, EP0986432 B1, discusses the theory, especially the precipitation characteristics exhaustively from paragraph 27 to paragraph 43.

However, now the inventors have further developed the idea and proved that when transition metal ion absorption for $H_2S$ removal, as the first wash, is combined with a methanol wash for $CO_2$ removal, said washes together provide unexpected synergism.

This first step is carried out by contacting the gas with the first absorbent solution, thus an acidic aqueous wash solution containing transition metal ions capable of binding to sulfide ions of the sulfide compounds present in the gas. The concentration of the transition metal cations is small, for example the aqueous solution has a concentration in respect of the transition metal ions of about 0.00001 to 0.01 M. A significant portion of the sulfide impurities present and contained in the gas can be converted into transition metal sulfides. The sulfides thus formed are preferably precipitated into the wash solution whereby the sulfide impurities are removed from the gas. The purified gas so obtained is recovered from the aqueous solution.

The metal ions, i.e. cations, of the wash solution are derived from transition metals selected from copper, zinc, iron and cobalt and mixtures thereof. Preferably the wash solution comprises bivalent metal cations ($Me^{2+}$) of copper ($Cu^{2+}$), zinc ($Zn^{2+}$) or iron ($Fe^{2+}$) or mixtures thereof, because these cations react with sulfides ($S^{2-}$) forming salts with very low solubility in water. In practice, most suitable salts used as metal cation sources comprise traces of other metal derivatives as well, e.g. commercial $CuSO_4$ salt comprises also some monovalent copper, as $Cu_2SO_4$. Copper has proven cost efficient and shown successful in experimental studies, especially when added as $CuSO_4$.

The transition metal ions are obtained from water soluble metal salts by dissolving said salts in water. In one embodiment, the aqueous solution is prepared by dissolving about 1 to 10,000 parts, preferably about 50 to 5000 parts by weight of a metal salt into 1,000,000 parts by weight of water.

When applied to $H_2S$ removal from syngas obtainable from biomass gasification, typically the concentration of the metal ion compound of the wash solution can be lower than about 1000 $ppm_w$, preferably lower than 100 $ppm_w$, calculated from the weight of the absorption liquid. This allows for very effective and profitable integrated process concept for removal of $H_2S$ and other impurities mentioned above from syngas.

The concentration of $Me^{2+}$ ions in the aqueous wash solution is typically about 0.00005 M to 0.005 mM per litre, preferably about 0.0001 to 0.001 M.

The aqueous wash solution is acidic or weakly acidic; preferably it has a pH of about 1 to 6.5, in particular about 1 to 5. The pH will vary within the indicated range depending on the selection of the metal cations. For example, in the embodiment in which metal cation source is $CuSO_4$, the aqueous solution has pH of at least about 3, preferably pH from 4 to 5.

Generally, the gas is contacted with the wash solution at a temperature from 10 to 80° C. and at a pressure from 1 to 50 bar (absolute pressure). Thus, the washing can be carried out at ambient temperature and pressure (20 to 25° C. and 1 bar(a)), although it is equally possible to work the present technology at lower temperatures (10 to <20° C.) and at elevated temperatures (>25 to 80° C.). The pressure can be in excess of 1 bar(a), for example about 1.5 to 50 bar(a).

Typically, the syngas obtained from gasification is recovered at higher temperature than indicated in the preceding. Therefore, in one embodiment, the gasification gas is cooled to a temperature in the above indicated range (10 to 80° C.) before being contacted with the washing liquid. When the temperature is higher than 80° C. the reaction is fast, but the precipitate is formed as very fine particles which are difficult to recover from the wash liquid. If the temperature is below 10° C., the need for cooling raises the operating costs. It is possible to recover some of the heat contained in the gasification gas by contacting it with a cooling media, for example with cooling water, in a heat exchanger.

However, as the aqueous wash is the first, the need for cooling exists only for the second wash, providing energy efficiency for both the wash method of according to the invention and for the overall gas production and further refining thereof.

Under these conditions, also acidic compounds, such as hydrogen chloride, may be absorbed. Further, the aqueous, metal ions containing solution can be applied in acidic form. Thus, it will be capable of absorbing further impurities, such as ammonia ($NH_3$) and hydrogen chloride (HCl) as well as other alkaline and acidic impurities. For the overall process, this is a further advantage.

The molar ratio of metal cations to sulfide compounds of the gas to be purified (i.e. $Me^{2+}/S^{2-}$ ratio of the feed) is typically in excess of 1, preferably from about 1.4 to about 6. Surprisingly, the use of metal ions is efficient and no great excess is needed, because the reaction proceeds nearly irreversibly as precipitated MeS exits the solution.

Process Equipment

Technically, said contacting gas with a first absorbent solution comprising transition metal ions in acidic aqueous solution may be implemented in tray or packed column and/or applied by spraying or atomizing. In a first preferred embodiment, the contacting of the syngas with the absorption medium takes place by spraying or atomizing the absorption medium into the gas. Preferably, the contacting of the syngas with the absorption medium takes place in the interface between the gas and droplets of the absorption medium. In a second preferred embodiment, the gas to be purified is bubbled into a stirred tank containing the absorption solution. In a third embodiment, absorption towers with plates and/or packing can be used in a counter-current operation. The detailed equipment type depends on the concentration of the metal ions in the solution and the amount and impurity content of the gas. One way of performing the chemical absorption process is to use chemical spray absorption concept combined with sieve tray(s) above the spray chamber section(s) as described and shown in FIG. 6 of application EP11153704.

Thus, in one particular embodiment based on the spray chamber approach, the wash solution is contacted with the gas in a spray chamber having an essentially vertical central axis, said gas being fed into the spray chamber from the bottom or from the top and withdrawn from the opposite end so as to advance in the direction of the central axis of the spray chamber. The wash solution is fed through spray nozzles arranged in at least two spray zones arranged in series along the central axis at different heights in the spray chamber. The gas is fed into a spray chamber, for example of the preceding type, via gas distributors arranged below the lowest spray zone, and the metal sulfide is withdrawn from the absorber along with the used wash liquid via an outlet arranged in the bottom part of the chamber.

In an embodiment, wherein regeneration is applied, after the absorption of the sulfides, MeS-crystals and other solids are separated from circulated aqueous wash liquid.

A transition metal ion washing unit can also consist of two aqueous $Me^{2+}$ wash sections (named following the direction of the gas flow), wherein the first section is operated with an aqueous wash dilute with $Me^{2+}$-ions and the second section with another aqueous wash rather highly concentrated with $Me^{2+}$-ions. The necessary amount of $Me^{2+}$-ions is fed in the form of an aqueous $Me^{2+}$-solution into the second wash section and circulated. Synthesis gas from the first wash section will be fed into the second wash section where almost all of $H_2S$ in synthesis gas will be removed by counter-current wash.

The purification results using transition metal ions in acidic aqueous washing liquids are very good. The present method is capable of removing a significant portion of the hydrogen sulfide from the gas. At least 98% by volume, preferably at least 99.5%, of the hydrogen sulfide is removed from the gas. As a result, in a preferred embodiment, the concentration of hydrogen sulfide of the gas after the first wash step is less than about 100 ppb by volume, in particular less than about 50 ppb by volume. This is further diminished by the second wash step removing mainly carbon dioxide, but reducing the hydrogen sulfide content to less than 20 ppb, preferably less than 10 ppb or even less than 1 ppb.

The gas purified in the first absorption provides the feed for the second absorbent step where a solution comprising an organic absorbent is used.

Wash with a Second Absorbent Solution Comprising an Organic Absorbent

After the step of contacting the gas with the first absorbent solution, the gas recovered therefrom is then contacted with a second absorbent solution comprising an organic absorbent.

Different organic absorbents are available for this wash step. Alcohols are common organic absorbents, e.g. methanol and ethanol. Other reagents commercially available are potassium salts of diethylamino-acetic acid and dimethyl-amino-acetic acid, sodium-2-amino-propanic acid, sodium salt of amino-propionic acid and sodium phenolate. Tributyl phosphate has been considered as a poor solvent for $CO_2$, but in combination with the first absorbent step according to the present invention, the performance is enhanced. Equally applicable organic solvent is propylene carbonate, which is mentioned to be specifically suitable for processes, wherein partial pressure for $CO_2$ is high. Another suitable absorbent in this category is N-methylpyrrolidone, which is a stable, non-corrosive and easily available solvent. For removal of other impurities (e.g. COS), N-methylpyrrolidone can be diluted with water. In general, said solvents typically comprise some water and if obtaint from regeneration, also some impurities.

A typical second absorbent solution comprises primarily methanol. Methanol wash as such is known in the art and a man skilled in the art has ample supply of literature (e.g. Esteban, A., V. Hernandez, and K. Lunsford, "Exploit the Benefits of Methanol," Proceedings of the 79th Annual Convention, Gas Processors Association, Tulsa, Okla., 2000.) to guide when selecting and optimizing the process conditions. Here, it is used in combination with aqueous transition metal wash, which combination provides good results for gases comprising $H_2S$ and abundant $CO_2$ as impurities.

The purpose of the methanol wash is to decrease the $CO_2$ concentration in the synthesis gas in order to decrease the total amount of inerts in Fischer-Tropsch feed. After tar removal the synthesis gas is cooled prior to MeOH wash, and the condensed water is removed. Next, the synthesis gas is cooled to the absorption temperature and fed into methanol wash column. The exit synthesis gas from the methanol wash column has a $CO_2$ concentration of about 1-5 mol-%, preferably less than about 4 mol-% and more preferably about 2%-mol. The gas thus recovered is led further via heating to the guard beds.

When used for gas obtained from gasification of biomass, the use of an organic solvent provides an additional advantage by removal of aromatic impurities selected from benzene, toluene and naphthalene. If a level low enough is obtained by the absorption step, no further separation is needed or optionally only simple guard beds can be included.

Within the context of the present invention, the combination of the first absorption step and the second absorption step provides advantages over prior art solutions. As the first absorption step effectively removes the $H_2S$, the conditions for the second absorption step need not be as stringent as in prior art processes. The present inventors have demonstrated that instead of the highly refrigerated conditions (−40° C., or even −70° C.) traditionally applied for e.g. methanol washes, the second absorption was performed at temperatures −23° C. and −13° C. and simulated at temperatures −10° C. with excellent results. Such results provide considerable benefits for process design and operation parameter selection.

When first and second absorption steps according to the present invention are applied, the requirements for second absorption conditions are relaxed. Generally in physical absorption, the higher the pressure, the colder the temperature and higher the purity of the absorbent, lead to the better washing effect. However, the present inventors have concluded that as the $H_2S$ has been removed from the gas, high $CO_2$ removal can be obtained by less stringent organic solvent regeneration and/or higher absorption temperature and/or lower pressure.

$CO_2$ Recovery

The $CO_2$ stream from the methanol regeneration is cooled in two stages: hydrocarbons are condensed from syngas, and methanol emissions to $CO_2$ stack are reduced by cooling. Cooled $CO_2$ stream is heated to prevent unwanted additional air moisture condensing near the stack.

Energy Consumption

The method of the present invention, as defined in claim 1, comprises two chemical absorption steps. In absorption processes, there are three stages determining the energy consumption. Preferably parameters contributing to low energy consumption are selected.

The first one is the conditioning of the gas (preheating or precooling of the gas) to be washed before feeding to the absorption stage. For chemical absorption the applicable temperature range is much broader and the need for thermal conditioning at this stage is typically lower than for physical absorption. In many cases, no conditioning is needed, as the chemical wash can be performed at the temperature of the preceding process step.

The next energy intensive phase consists of the absorption stages. Therein, depending on the reagents, conditions and level of purity selected, need for cooling or heating the reactor and/or reagents exists particularly in the physical absorption.

The third point where energy consumption must be considered is regeneration of the absorbent.

Regeneration of the Absorbent

As an embodiment of the invention, the method can further comprise regeneration of first or second absorbent solution or optionally both.

Depending on the absorbent and the level of purity required, three procedures for regeneration thereof are known to a man skilled in the art. The most simple and cheapest method for regeneration is the flash regeneration, wherein the absorbent pressure is decreased e.g. gradually. The acid gas concentration is determined by the last step, the pressure of which usually is slightly higher than ambient pressure. By employing vacuum in the last step, the acid gas concentration in the absorbent can further be lowered.

When higher purity is required, the regeneration can be performed by stripping the absorbent with an inert gas. In stripping, the absorbent pressure is lowered and thereafter the partial pressures of the gases to be removed are decreased by feeding inert gas to the reactor. A negative side of this regeneration system is the dilution of the acid gas flow with inert gas used.

Both regeneration methods, flash and stripping, still leave some acid gas to the absorption solvent. For cases, where the level of hydrogen sulfide to be removed is very low, these methods are sufficient. However, for high hydrogen sulfide concentrations regeneration based on solvent boiling e.g. hot regeneration are needed. This provides very high degree of purity for the gas to be washed and additionally high acid gas concentration in the effluent gases. The principle underlying this method is that gas solubility into the absorbent solvent is reduced by rising the temperature. The solvent is heated to its boiling point, whereby the vaporized solvent strips off the impurities. When the vapor is thereafter cooled down and condensed, it can be reused in the absorption. Hot regeneration required expensive heat exchangers and consumes enormously heat for vaporization of the solvent, it is the most expensive of the methods mentioned. However, hot regeneration is often necessary for chemical absorbents as the acid gases are chemically bonded to thereto.

For physical absorbent, here methanol, regeneration by pressure drop or gradual decrease is most suitable due to the strong correlation between the acid gas solubility and partial pressure. If high purity is required, the regeneration of the physical absorbent can be performed by stripping with an inert gas or by boiling or distillating the solvent as well.

Preferably the regenerated absorption solution can be returned to the wash process and reused after adjustment to proper reaction conditions.

In an embodiment, where the wash combination according to the invention is applied as a part of biomass to gas process, the regeneration of the second absorbent solution comprising an organic solvent can be designed to serve the overall process. The exit methanol from the methanol wash column is led, first, into the CO flash drum, in which mainly CO is recovered and recycled to the main stream. Next, the exit methanol is flashed into obtain $CO_2$ to be used in the biomass feed lock hoppers. Finally, the exit methanol is flashed to obtain a feed for the middle of the methanol wash column.

A part of the flashed methanol is led to a regeneration column, where the methanol is stripped with an air-nitrogen-mixture to obtain a very pure feed for the top of the methanol wash column. Nitrogen is added to the stripping air to reduce the oxygen concentration below the explosion limit.

A part of the regenerated methanol is fed to another methanol drying column, where water is removed from the methanol. Impurities are bound to accumulate into the methanol recirculation and thus a part of the methanol is bled to waste MeOH tank.

It must be noted, that the regeneration requirements for the present process are less stringent than for processes using methanol wash only, as the synergistic action of the two absorption processes provides high purity.

Recovery of Metal Sulfides

Furthermore, from the aqueous solution or slurry, the metal sulfides, which have poor solubility to the aqueous media, can be removed by any solid liquid separation process. Separation of solids is simple and many separation techniques, such as filtration, settling or hydrocyclones, are available. Such a separation is attractive in comparison to prior art methods, wherein the regeneration of the $H_2S$ containing absorbent is typically conducted in a regeneration section. From said prior art regeneration section the sour gases separated from absorbent are led to a sulfur plant converting $H_2S$ into elemental sulfur (S). Such investments can totally be avoided.

Metal sulfide precipitate can be further treated to separate the metal and sulfur derivative and both consequently recovered. For example, when metal sulfide is CuS, separated solids can be utilized as raw material in copper industry, either for preparation of metallic copper or other copper compounds, and sulfur recovered from that process can be used as raw material for sulfuric acid production, typically integrated to the site.

Use of the Purified Gas

After the treatment according to claim 1, purified gas is obtained. The level of $H_2S$ in gas recovered from step e is less than 20 ppb, preferably less than 10 ppb, and most preferably less than 1 ppb. The purified gas has several uses. It can be used for producing hydrogen, methanol, ethanol, dimethyl ether or aldehydes optionally by hydroformulation or directly used in engines for producing for example electricity. Also synthetic natural gas (SNG) can be produced from syngas.

The purified gas can also be used for producing a hydrocarbon composition containing $C_4$-$C_{90}$ hydrocarbons, optionally after further purification. In particular, the hydrocarbon composition can be produced by a Fischer-Tropsch (FT) process.

As a specific embodiment of an overall process, the acid gas removal can be applied in a process for hydrocarbons or derivatives thereof production from biomass raw material. The method then comprises the steps:
  i. gasifying the biomass raw material in the presence of oxygen and/or steam to produce a gas comprising carbon monoxide, carbon dioxide, hydrogen, water and hydrocarbons;
  ii. optionally a tar reforming step;
  iii. optionally removing tar components e.g. naphthalene from the gas;
  iv. optionally adjusting the hydrogen to carbon monoxide ratio;
  v. wash according to claim 1;
  vi. converting in a synthesis reactor at least a significant part of the carbon monoxide and hydrogen contained in the gas into a product selected from hydrocarbon composition and derivatives thereof; and
  vii. recovering the product.

According to a preferable embodiment, the steps are taken in said order from i to vii. Even though wash according to claim 1 is here referred to as wash step v, it is understood to comprise all the features of claim 1 as filed.

The removal of $H_2S$ is necessary to protect the synthesis catalysts. Furthermore, when applying this method for hydrocarbon production using FT synthesis, even though $CO_2$ acts as an inert in the synthesis, it effects the synthesis selectivity guiding towards $C_{5+}$products, whereby at least partial removal of $CO_2$ is rendered desirable for the overall process. Contrarily to the processes disclosed in the prior art documents for coal derived syngas purification, the attention in acid gas removal, when applied for biomass originated gas, is mostly paid to $CO_2$ removal.

Another considerable value in favor of the present process is that high pressure advances both absorption and the subsequent FT synthesis. If the pressure is increased before the absorption or at least before the second wash of the present method, there is no need to alter the pressure after washes. A man skilled in the art apprehends that the increasing the pressure in absorption above the level needed for the level required for FT synthesis is not preferable, though possible. Typically the pressure employed in FT-synthesis is from 20 to 60 bar, preferably from 20 to 30 bar, which practically sets the upper limit to the absorption process.

In an embodiment of this method, use of iron and cobalt as metal ions in the first absorbent solution is advantageous, because they are used in other parts of the overall process, in particular as FT synthesis catalysts. However, copper is the preferably used metal ion, particularly as $CuSO_4$.

Optionally, the process can comprise a tar reforming step, e.g. according to patent application FI 20105201. It discloses a method for purifying the gasification gas from tar-like impurities and ammonia by using catalysts at high temperatures. The pre-catalyst zone comprises a zirconium/noble metal catalyst layers followed by the actual reformer catalyst zone comprising a nickel or another reforming catalyst layer(s). Oxygen or another oxidizer, and optionally steam, can be led to the reforming zone to increase the temperature.

For FT catalytic synthesis, the hydrogen to carbon monoxide molar ratio is preferably from 1.7 to 2.2, advantageously about 2. To adjust the ratio, a man skilled in the art can select between different strategies. Said ratio can be adjusted by a water gas shift (WGS) reaction either as sour gas shift or after appropriate gas sweetening, thus gas purification from acid gases. Another approach is to add hydrogen obtained from elsewhere in the process or from another process to adjust said ratio.

To some extent, COS may be hydrolysed in the first absorption step of the present invention. However, sometimes a separate hydrolysis is needed. According to an embodiment of the above method for hydrocarbon production, step v is preceded by a COS hydrolysis step. Said hydrolysis produces $H_2S$, which is consequently removed in the first absorption step and $CO_2$ removed in the second absorption step of the wash process of the present invention. This is beneficial in cases where the synthesis gas contains distracting amounts of COS. COS has a poor solubility to both physical and chemical absorbents, causing difficulties in purification.

In addition, according to one embodiment, it is also beneficial to operate a water scrubber before the wash steps to minimize $NH_3$ and HCl in transition metal precipitation stage. Said $NH_3$ and HCl interfere metal precipitation stage and their removal contributes to more pure CuS precipitate.

The following experiments were conducted to evidence the concept of the present invention. They should be understood illustrating certain examples of the invention and no limiting by any means.

Experimental Part

The method of the present invention is a two-stage washing process.

The first phase, absorption using an aqueous solution comprising transition metal ions, was described in the applicant's earlier patent application EP11153704. These experiments, now disclosed as examples 1 and 2, apply for the first phase of the present invention as well. In said first phase, the gas to be purified is contacted with a first absorbent solution comprising transition metal ions, said transition metals selected from copper, zinc, iron and cobalt and mixtures thereof, in acidic aqueous solution (in the experiments aqueous $CuSO_4$ solution); hydrogen sulfide is bound to said first absorbent solution and gas recovered.

The second phase, absorption by cold methanol is widely described in the prior art. As the second phase of the present invention, wash with absorbent comprising an organic solvent has a special feature of removing mainly carbon dioxide, as sulfur derivatives have already been removed. It can be described as first contacting gas recovered from first wash with a second absorbent solution comprising an organic solvent, binding carbon dioxide to said second absorbent solution and finally recovering the washed gas, preferably for further processing.

The experiments conducted to provide evidence on the combination of said phases, include results from a pilot scale run (Examples 3 and 4) and simulated overall process (Example 5).

1 Example 1. Semibatch Absorption Tests of $H_2S$ Removal, Using Aqueous Copper Sulfate (CuSO4) as a Model Absorbent of the First Absorbent Solution.

1.1 Materials and Methods

The absorption experiments were carried out using a micro reactor equipment for WGS reaction. Semibatch absorption tests of $H_2S$ removal, using aqueous copper sulfate ($CuSO_4$)-solution as absorbent, were carried out in a simple 0.5 liter gas-wash bottle with magnetic stirring, placed in the product line of a micro reactor before the online mass spectrometer.

Absorption tests were carried out at room temperature and atmospheric pressure. Total gas feed flow was 12 dm³/h to the WGS reactor. The basic gas feed composition is shown in Table 1.

TABLE 1

Basic feed composition.

| litre(NTP)/h | Total flow | | | | | |
|---|---|---|---|---|---|---|
| | $H_2O$ vol-% | CO vol-% | $CO_2$ vol-% | $H_2$ vol-% | $N_2$ vol-% | $CH_4$ vol-% |
| 12.0 | 36 | 12 | 22 | 24 | 5 | 1 |

The impurity components were purchased from AGA as dilute hydrogen mixture gases $H_2S/H_2$, $COS/H_2$ and $NH_3/H_2$. In the feed, $H_2S$ concentration was 500 ppm (vol) in all experiments. In some tests also 85 ppm COS and 800 ppm $NH_3$ were used in the feed. However, nearly all COS was hydrolyzed already before the absorption bottle as it was not possible to bypass the catalytic reactor, where COS hydrolysis took place as a side reaction of water gas shift reaction.

The product gas was analyzed online using a mass spectrometer (GC-MS but GC separation not in use). The quantitation limit is dependent on the component, and in these MS measurements quantitation limit was about 1 ppm.

In absorption experiments carried out in laboratory in bubbled gas wash bottle described above the following test program was carried out as follows:

The $CuSO_4$ concentration varied in different experiments from dilute 50 ppm up to 500 ppm. The mass transfer in the bubbled gas wash bottle was enhanced by agitation.

Absorption rate of $H_2S$ in $CuSO_4$-water solution was measured at different $CuSO_4$ concentrations.

Identification/quantification of crystallized Cu-solid components and particle size distribution of crystallized particles.

1.2 Results

Figure 2:
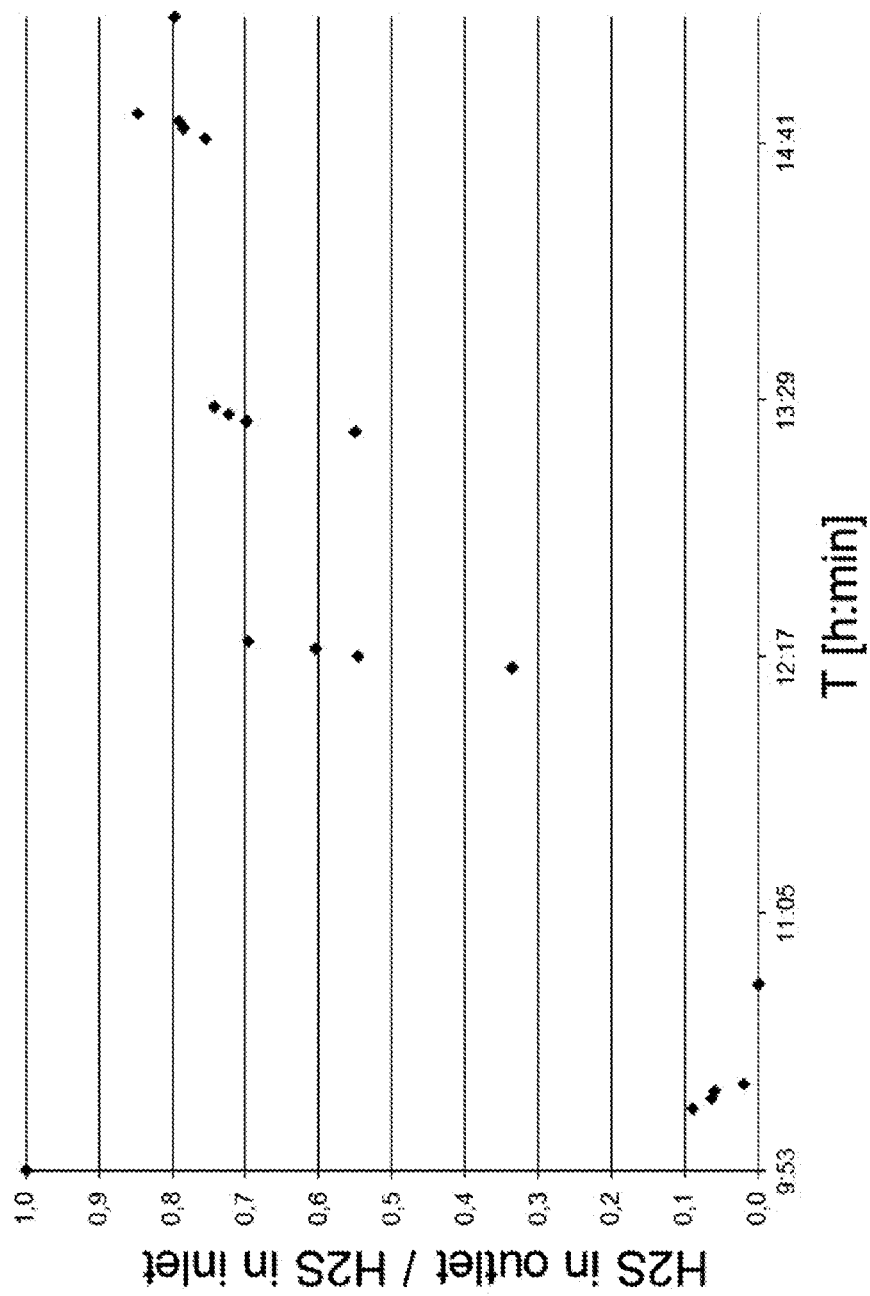
FIG. 2 illustrates another experiment comprising contacting with first absorbent solution, here aqueous $CuSO_4$ solution, binding $H_2S$ thereto and recovering gas according to steps a, b and c of claim 1. In the figure, a ratio of $H_2S$ mole flow in the wash bottle outlet/$H_2S$ mole flow in the wash bottle inlet as a function of time [h:min] is disclosed. The experiment was started at 9:53 and last point measured 15:16.
Figure 3:
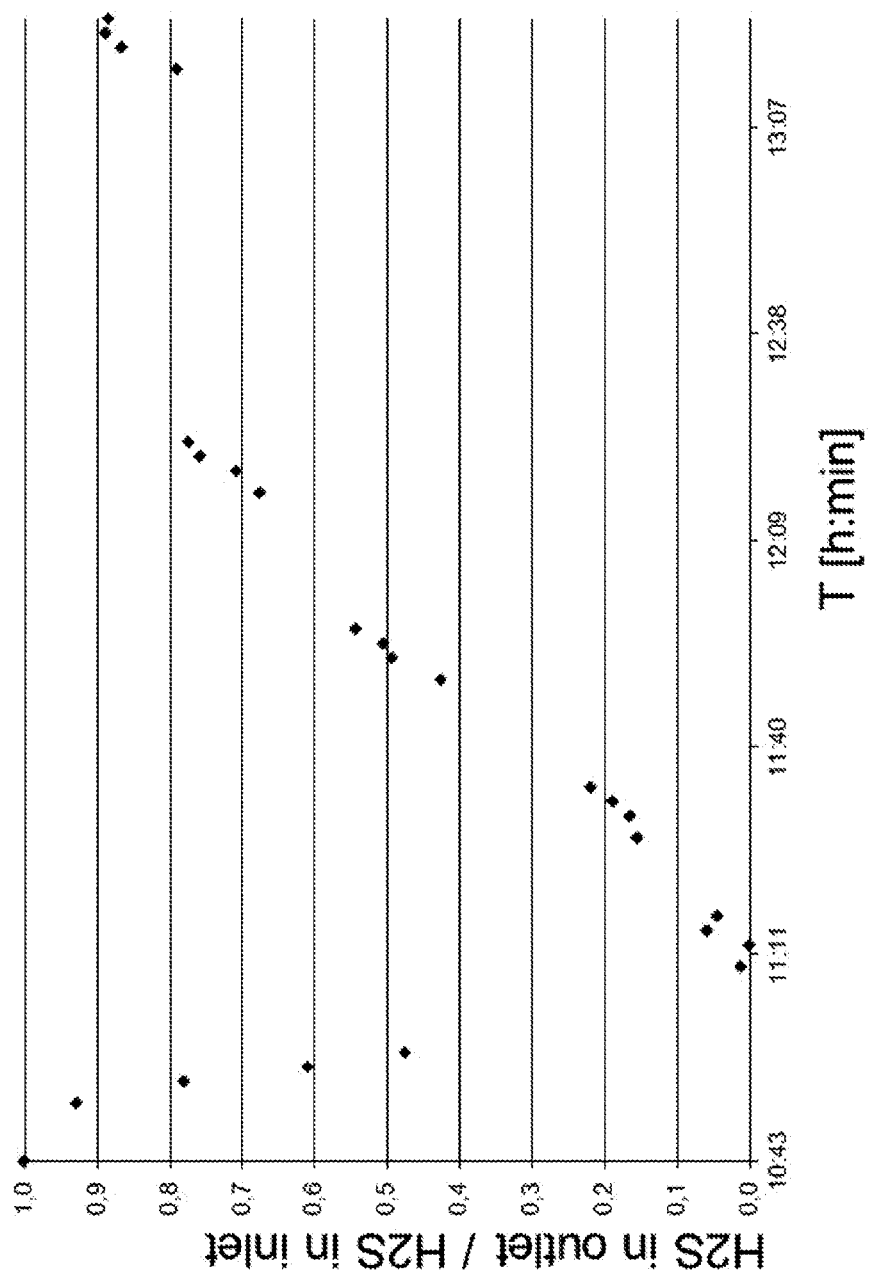
FIG. 3 illustrates an experiment comprising contacting with first absorbent solution, here aqueous $CuSO_4$ solution, binding $H_2S$ thereto and recovering gas according to steps a, b and c of claim 1. In the figure, a ratio of $H_2S$ mole flow in the wash bottle outlet/$H_2S$ mole flow in the wash bottle inlet as a function of time [h:min] is disclosed. The experiment was started at 10:43 and last point measured 13:22.

The feed rates of different impurity components in synthesis gas entering WGS reactor in the experiments were:

Test 1—$CuSO_4$ conc. 0.01 wt-%, $H_2S$ concentration in feed gas 500 ppm$_v$,

Test 2—$CuSO_4$ conc. 0.01 wt-%, $H_2S$ concentration in feed gas 500 ppm$_v$, $NH_3$ 800 ppm$_v$, COS 85 ppm$_v$, Test 3—$CuSO_4$ conc. 0.0051 wt-%, $H_2S$ concentration in feed gas 500 ppm$_v$, $NH_3$ 800 ppm$_v$, COS 85 ppm$_v$, $H_2S$ mole flow in wash bottle outlet/$H_2S$ mole flow in wash bottle inlet in different experiments are shown as a function of time in FIGS. 1-3.

1.3 Conclusions $CuSO_4$ was capable of removing 500 ppm $H_2S$ (mol-frac) completely from feed gas both with 0.01 and 0.005 wt-% aqueous solutions. The product is solid CuS deposit.

Too high pH resulted in deposition of e.g. metal hydroxides or carbonates in which case no or less hydrogen sulfide was removed. Carbonate formation was also dependent on $CO_2$ partial pressure.

Too low pH resulted in no deposit formation in which case no hydrogen sulfide was removed (results not shown).

$NH_3$ in the feed did not influence $H_2S$ removal by copper sulfate.

With regard to the results described in the FIGS. 1-3 it should be pointed out that the experimental setup was the following: the bottle of aqueous copper sulphate wash solution was placed between two reactor product coolers and drum type volumetric gas flow meter. By opening the valves the gas could be made to drum type volumetric flow through the $CuSO_4$ aqueous solution and after that to the GC-MS, and subsequently the gas was conducted to the drum type volumetric gas flow meter for venting. The first point shown graphically is from the point of time immediately before the gas was conducted to the $CuSO_4$ bottle. At that point of time, precipitation of CuS is not detectable yet. Then, a series of 4 samples was taken within 7 minutes, and after a short break, a new series of 4 samples was taken within 7 minutes etc.

The points in the figures in which the $H_2S$ concentration is 0 indicate points where all $H_2S$ is removed from the gas. Suddenly after that all the copper is depleted and the $H_2S$ concentration increases again.

Some of the tests have contained COS in the feed. Having passed the shift reactor it has in practice been completely hydrolyzed since the feed also contains water:

$$COS+H_2O \longleftrightarrow H_2S+CO_2$$

Then, there is more $H_2S$ in the feed of the $CuSO_4$ washing than the amount of $H_2S$ fed into the system. This effect could be seen in the analysis in the amount of effluent COS 0-3 $ppm_v$.

2 Example 2. Absorption Test for $H_2S$ Removal from Syngas in Packed Bed Absorption Column.

Absorption tests for $H_2S$ removal from syngas in packed bed absorption column were carried out in a Pilot scale test unit. The absorber performance was tested in a syngas preparation plant in Varkaus, Finland.

Absorber details and data sheets are shown below:
Absorber: packed bed absorber, packing metal, 2-in or 50 mm, surface area 100 $m^2/m^3$,
  height: 9 m, diameter 0.1 m.
Feed Gas: feed rate: 50-60 kg/h
  pressure 30 bar, temperature 25° C.
  Composition/mol-%: CO 21, $CO_2$ 30, $H_2$ 31, $CH_4$ 3, $N_2$ 15, $H_2S$ 140 ppm, naphthalene 100 ppm, benzene 1200 ppm and traces $NH_3$ and COS.
Absorbent Feed:
  $CuSO_4$—water, concentration 0.15 wt-%
  Feed rate was varied, equivalent $Cu^{2+}$ molar feed ratio to $H_2S$ 1.5-6

The mol-% of $H_2S$ in effluent gas was measured by on-line hydrogen sulphide gas analyser. The measured $H_2S$ mole fraction in effluent syngas was at minimum 70 ppb at equivalent $Cu^{2+}$ molar feed ratio to $H_2S$ value of 6

As a result, the correlation between product gas S concentration and stoichiometric Cu/S ratio in the feed was determined. For stoichiometric ratios from 1 to 5 almost linear correlation was observed, wherein the stoichiometric ratio of 1.5 for Cu/S led to less than 3 $ppm_v$ $H_2S$ and ratio 5 led to 90 $ppb_v$ $H_2S$ in the product gas.

3 Example 3. Two-Stage Washing Protocol in Pilot-Scale
3.1 Experiment Equipment

Absorption experiments were conducted as batches in a pilot scale apparatus. The feed was provided from a syngas preparation plant in Varkaus, Finland. A packed bed absorption column was employed for the wash with aqueous solution, thus the first phase.

Results were measured with standard analysators; $CH_4$, CO and $CO_2$ with gas chromatography; $H_2$ with FID and sulfur contents with Hobre Novasulf HG400 analysator.

3.2 Materials

The feed gas, gas to be purified, was originated from gasification of biomass. Therefore there were some minor fluctuations in the feed composition. Composition of the feed gas is compiled in table 5.

TABLE 5

Feed gas composition.

| | CO/vol-% | $CO_2$/vol-% | $H_2$/vol-% | $CH_4$/vol-% | $N_2$/vol-% | $H_2S$/ppm |
|---|---|---|---|---|---|---|
| Feed gas | 30 | 28 | 34 | 3 | 5 | 150-190 |

3.3 Conduct of the Experiments

Total gas feed was 50 kg/h.

At the beginning of the first absorption step, the $CuSO_4$ feed was zero. As the experiment started, aqueous solution was fed at rate 300 kg/h. Both fresh feed and recycling were applied. In the aqueous feed, the concentration of $CuSO_4$ was 0.210 g/l. Considering the feed rates, this gives a stoichiometric ratio of Cu/S of 1.10. The reaction temperature was set to 29° C.

The methanol wash was conducted at a temperature of −23° C. and methanol feed to wash column was 500 kg/h.

The experiment was run for 12.5 hours.

3.4 Results

The results revealed that of 160 ppm $H_2S$ present in the feed, only 160 ppb remained in the gas after $CuSO_4$ wash. This gives 99.9% $H_2S$-removal efficiency for the first phase. The concentration of $H_2S$ was further reduced in methanol wash, wherein of the 160 ppb present in gas before methanol absorption phase, only 0.1 ppb remained after said absorption. The gas composition after methanol wash was $H_2$ 48 vol-%, CO 30 vol-%, $CO_2$ 4% $CH_4$ 4 vol-% and the rest $N_2$. Thus, the methanol has reduced the concentration of $CO_2$ from original 28 vol-% to 4 vol-%.

3.5 Conclusions

It can be concluded that the two-stage washing process combining a chemical washing step with a methanol wash removes $H_2S$ with very high efficiency (from 160 ppm to 0.1 ppb) and $CO_2$ with sufficient efficiency.

4 Example 4, Two-Stage Washing Protocol in Pilot-Scale, High Purity of $H_2S$
4.1 Experiment Conditions.

The conditions were the same as in example 5, except for gas feed, which was 65 kg/h, aqueous $CuSO_4$ feed was 200 kg/h, and concentration 0.56 g/l, giving a stoichiometric ratio of Cu/S of 2.42. Experiment conditions and results describing the recovered gas are given in Table 6.

The reaction temperature was set to 34° C.

The methanol wash was conducted at a temperature of −13° C.

TABLE 6

| Example 4 | aq. feed kg/h | $CuSO_4$ g/l | Gas feed kg/h | $H_2S$ ppb | $H_2$ vol-% | CO vol-% | $CO_2$ vol-% | $CH_4$ vol-% | $N_2$ vol-% |
|---|---|---|---|---|---|---|---|---|---|
| feed | 200 | 0.56 | 65 | 100*10³ | 33 | 25 | 32 | 2.5 | 7.5 |
| between washes | n.d. | n.d. | n.d. | 110 | n.d. | n.d. | n.d. | n.d. | n.d. |
| recovered gas | n.d. | n.d. | n.d. | 0.2 | 49 | 24 | 4 | 3 | 20 |

5 Example 5, A Simulation of a Method for Washing Hydrogen Sulfide and Carbon Dioxide According to the Present Invention Combining a $CuSO_4$ Wash and a Methanol Wash.

In this example a two-stage wash according to one embodiment of the invention was simulated. In simulation gas is in first stage fed to CuS precipitation column for removing $H_2S$ and some trace components followed by methanol wash for removing $CO_2$. The simulation was made by Aspen Plus flow sheeting program with the following process parameters:

The absorber models are rate-based models realized in Radfrac

The physical property and VLE method of ELECNRTL

All reactions, except for Cu-reaction, Henry-components, parameters, etc. are set as Aspen Plus defaults and realized through the Electrolyte wizard Results from simulation are compiled in tables 7 and 8.

TABLE 7

Simulation results; selected mole fractions of components when applying method of the present invention with the methanol temperature of −10° C.

| component | Syngas in | Syngas out |
|---|---|---|
| $CO_2$ | 0.2603 | 0.0113 |
| $H_2S$ | $8.19*10^{-5}$ | $4.46*10^{-7}$ |

From these results, it can be concluded that said combination of aqueous $CuSO_4$ wash and methanol wash removes $H_2S$ and $CO_2$ effectively.

From equivalent simulations using first only methanol (MeOH in table 8) as absorbent and then using combination of the first and second absorbent solutions ($CuSO_4$+MeOH in table 8) according to the present invention, energy consumptions as steam and energy consumed was calculated. The results are given in table 8.

TABLE 8

Energy consumption as steam and electricity used for the absorption steps.

| Wash | LP steam (MW) | Electricity (MW) |
|---|---|---|
| MeOH | 46 | 26 |
| $CuSO_4$ + MeOH | 4 | 7 |

These results confirm the effect of the present method for both the steam and electricity consumption. It verifies the energy efficiency of the removal of sulfur components and carbon dioxide from the syngas.

The invention claimed is:

1. A method for washing hydrogen sulfide and carbon dioxide from a gas obtainable by gasification of carbonaceous biomass, said method comprising:
   a. contacting said gas with a first absorbent solution that is formed from only a transition metal ion-containing compound and water, said transition metal ion being selected from a group consisting of copper, zinc, iron, cobalt and mixtures thereof;
   b. binding hydrogen sulfide to said first absorbent solution;
   c. recovering the gas from step b;
   d. contacting recovered gas from step c with a second absorbent solution having an organic solvent, wherein the contacting of said recovered gas with the second absorbent solution takes place at a temperature in a range from −23 to 10° C., wherein the second absorbent solution having an organic solvent comprises methanol;
   e. binding carbon dioxide to said second absorbent solution; and
   f. recovering washed gas from step e.

2. The method according to claim 1, wherein a concentration of the transition metal ions in the first absorbent solution is less than about 1000 weight-ppm, calculated from a weight of the first absorbent solution.

3. The method according to claim 1, wherein said transition metal ions comprise:
   copper.

4. The method according to claim 1, wherein the contacting of said gas with the first absorbent solution takes place at a temperature from 10 to 80° C. and at a pressure from 1 to 50 bar.

5. The method according to claim 1, wherein an $H_2S$ level of gas recovered from step f is less than 20 ppb.

6. The method according to claim 1, wherein (a) said first absorbent solution is regenerated after gas recovery, (b) said second absorbent solution is regenerated after gas recovery, or (c) said first and second absorbent solutions are regenerated after gas recovery.

7. A method according to claim 1 for producing hydrocarbons or derivatives thereof from biomass raw material, the method comprising:
   i. gasifying the biomass raw material in a presence of oxygen and/or steam to produce a gas containing carbon monoxide, carbon dioxide, hydrogen, water and hydrocarbons;
   ii. performing the washing method according to claim 1;
   iii. converting in a synthesis reactor at least a significant part of carbon monoxide and hydrogen contained in the gas into a product selected from hydrocarbon composition and derivatives thereof; and
   iv. recovering a hydrocarbon or derivative thereof as the product.

8. The method according to claim 7, wherein step ii is preceded by a COS hydrolysis step.

9. The method according to claim 1, wherein the second absorbent solution comprises:
   an organic solvent selected from a group consisting of methanol, ethanol, a potassium salts of diethylamino-acetic acid, a potassium salt of dimethylamino-acetic acid, sodium-2-amino-propanic acid, a sodium salts of amino-propionic acid, sodium phenolate, tributyl phosphate, propylene carbonate, N-methylpyrrolidone and mixtures thereof.

10. The method according to claim 1, wherein a concentration of the transition metal ions in the first absorbent solution is less than about 100 weight-ppm, calculated from a weight of the first absorbent solution.

11. The method according to claim 2, wherein said transition metal ions comprise:
   copper.

12. The method according to claim 1, wherein said transition metal ions comprise:
   $CuSO_4$.

13. The method according to claim 1, wherein an $H_2S$ level of gas recovered from step f is less than 1 ppb.

14. The method according to claim 7, comprising:
   performing a tar reforming of the gas;
   removing tar components from the gas; and
   adjusting a hydrogen-to-carbon monoxide ratio of the gas.

15. The method according to claim 1, wherein the second absorbent solution having an organic solvent consists substantially of methanol.

16. The method according to claim 3, wherein the second absorbent solution comprises:
   an organic solvent selected from a group consisting of methanol, ethanol, a potassium salt of diethylamino-acetic acid, a potassium salt of dimethylamino-acetic acid, sodium-2-amino-propanic acid, a sodium salts of amino-propionic acid, sodium phenolate, tributyl phosphate, propylene carbonate, N-methylpyrrolidone, and mixtures thereof.

17. The method according to claim 3, wherein the second absorbent solution having an organic solvent comprises: methanol.

18. The method according to claim 1, wherein a molar ratio of the transition metal ions to sulfide compounds present in the gas obtainable by gasification of carbonaceous biomass, is from about 1.4 to about 6.

19. The method according to claim 1, wherein the first absorbent solution consists of water and the dissolved transition metal ion-containing compound.

20. The method according to claim 3, wherein said transition metal ions further comprise: at least one transition metal ion selected from the group consisting of zinc, iron, and cobalt.

21. The method according to claim 1, wherein the first absorbent solution is the only solution that is contacted with said gas prior to the step c of recovering the gas.

22. The method according to claim 1, wherein the contacting of said recovered gas with the second absorbent solution takes place at a temperature in a range from −23 to −10° C.

23. The method according to claim 1, wherein the contacting of said recovered gas with the second absorbent solution takes place at a temperature in a range from −23 to −13° C.

24. The method according to claim 1, further comprising, prior to step a, scrubbing the gas obtainable by gasification of carbonaceous biomass in a gas scrubber, wherein the scrubbing is conducted at the same temperature as step a, and where the results gas is the gas that is contacted with the first absorbent solution in step a.

* * * * *